Patented Oct. 2, 1945

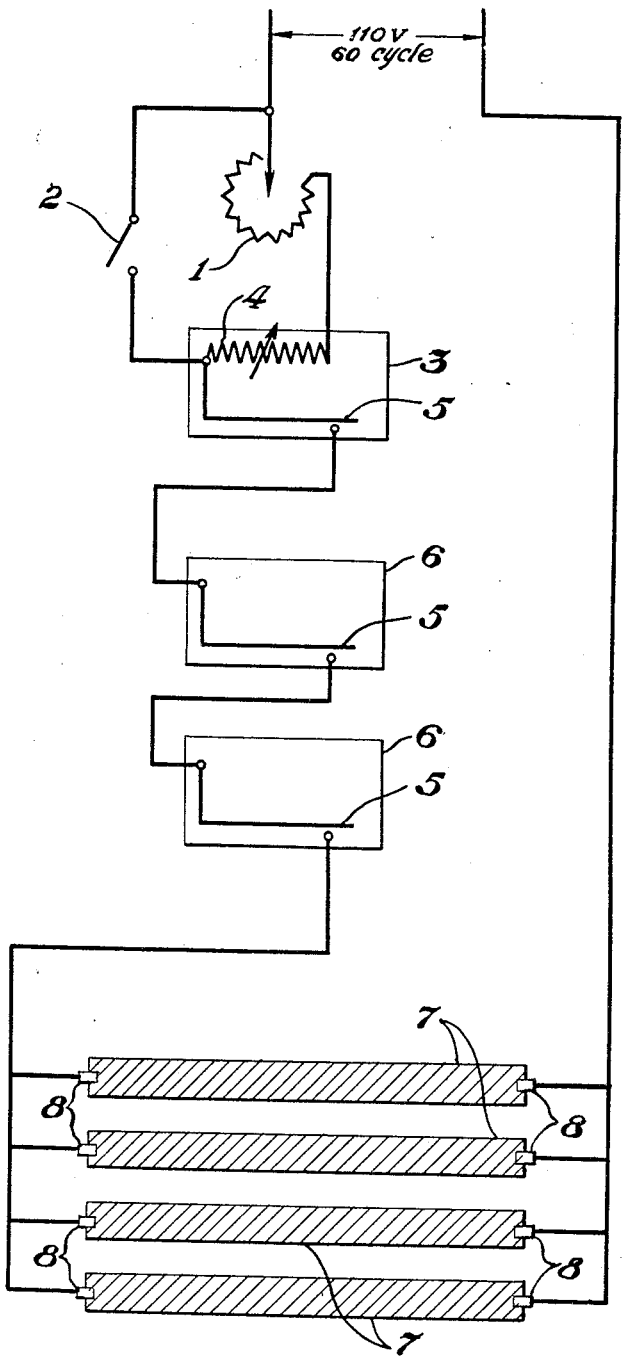

2,386,095

UNITED STATES PATENT OFFICE 2,386,095

HEATING DEVICE

Donald E. Edgar, Westport, and David J. Sullivan, Fairfield, Conn., assignors to E. I. du Pont de Nemours & Company, Wilmington, Del., a corporation of Delaware Application February 18, 1944, Serial No. 522,978

5 Claims. (Cl. 219—46)

This invention relates to improved heating elements and more particularly to heating devices which supply moderate heating effects from electric current as the source of energy.

Conventional heating elements for household heating pads, blankets, flying suits, etc., in which electricity is used as the source of energy generally consist of resistance wire or ribbon of metal alloy, for example "Nichrome," which because of its relative resistance to the passage of electric current, generates heat. The heat obtained by such means is readily controlled by rheostats and thermostats comprising a part of the electrical circuit. Heating devices of this type have long been employed extensively in household and industrial appliances but are characterized by certain important deficiencies which have been overcome in the improved heating element of the present invention. With earlier devices, uniformity of heating over any considerable area not immediately adjacent to the heating element is lacking. In utilities such as heating pads, flying suits and the like, which are subject to considerable flexing, the metal resistance wire heating element due to bending and twisting encountered in the normal use of equipment of this type frequently breaks, thus interrupting the flow of electricity and rendering the device useless. The development of a short circuit through insulation failure with attendant hazards as a result of bending and twisting of certain equipment of the aforementioned type when conventional heating elements are used constitutes another deficiency. Furthermore, with the older heating elements it is impossible to construct equipment that will fit all contours.

This invention has as an object the provision of an improved heating element which affords more uniform heating effects. Another object is the provision of a heating element which has longer useful life in devices which are subjected to considerable flexing during normal usage. Another object is the provision of a heating element which does not tend to break and interrupt the flow of electricity as a result of bending and twisting of equipment of which the improved element forms a part. Another object is the provision of a heating element which is less expensive and less hazardous than conventional type elements presently available. Another object is the provision of an improved heating element which will readily fit all contours. A further object is the provision of a heating element which is tough and flexible and which is resistant to water and mineral oils. A still further object of the invention is the provision of an improved heating element which is not susceptible to oxidation and which will not deteriorate on long exposures to heat. Other objects will appear as the description of the invention proceeds.

These objects are accomplished in accordance with the present invention by means of a semiconducting composition comprising a carbon black of low electrical resistivity, usually less than about 1.0 ohm per 1" cube and preferably on the order of 0.152 to 0.217 ohm per 1" cube, dispersed in an electrically substantially non-conducting organic vehicle containing an alkyd resin as an essential ingredient, said composition being in direct contact with electrical connectors and forming a part of the electrical circuit. A specific and preferred embodiment contemplates a heating element comprising a non-inflammable substrate, for example, a base fabric of asbestos or glass fibres carrying the above described coating in direct contact with suitable electrical connectors for installing the unit in an electrical circuit.

The following examples are given by way of illustration only and no limitations are intended thereby except as indicated in the appended claims:

Example 1

| | Per cent by weight |
|---|---|
| Alkyd resin solution | 43.8 |
| Polyvinyl butyral resin ("Butacite") | 9.8 |
| Urea-formaldehyde resin solution | 7.3 |
| Dicapryl phthalate | 4.9 |
| Acetylene black | 34.2 |
| | 100.0 |

The alkyd resin solution of this example consisted of a 60% solution of a 53% castor oil modified diglyceroltriphthalate resin in a volatile vehicle consisting of

| | Per cent by weight |
|---|---|
| Isobutyl alcohol | 80 |
| Petroleum naphtha (B. R. 135–215° C.) | 20 |
| | 100 |

The polyvinyl butyral resin may be prepared by any of the methods well known in the art, for example, by treating polyvinyl acetate with a hydrolyzing agent such as sulfuric acid, followed by condensation with butyraldehyde to give a solid, fusible resin soluble in certain organic solvents. The resin of the example had a hydroxyl content of about 10%. The viscosity of the resin was 75 centipoises determined on a 5% solution of the resin in 2B denatured alcohol.

The urea-formaldehyde resin solution consisted of a 60% solution in butyl alcohol of a butyl alcohol modified urea-formaldehyde resin as described in Edgar et al. U. S. Patent 2,191,957.

The acetylene black which imparts semi-conducting properties to the composition is prepared in accordance with the description contained in "Canadian Chemistry & Metallurgy," May 1933, pages 93-95. In addition to this carbon black, there are now on the market many blacks with high conducting properties. Chapter 7, page 67 of the book "Columbian Colloidal Carbons," published in 1938 by the Columbian Carbon Company, defines a suitable type of black as having an electrical resistance in ohms per 1" cube of 0.152 to 0.217, although a somewhat higher resistance up to about 1.0 ohm per 1" cube is satisfactory. In the claims such blacks are termed "low resistance carbon blacks."

The composition was prepared by combining the "Butacite" resin and dicapryl phthalate on differential speed conventional rubber roller mill, after which the acetylene black, alkyd resin and urea-formaldehyde resin are incorporated, preferably by adding alternate portions of the acetylene black and resin solutions to the material already being worked on the rolls. The materials are milled for about 20 minutes or until a homogeneous mixture is obtained. This step in the preparation of the composition may also be carried out in a kneading machine, preferably of the heavy duty type such as a Banbury mixer. The resulting plastic stock from the roller mill was cut into small pieces and churned with xylol in the proportion of about 1 part of plastic to 0.4 part of xylol in an agitator mixer until a homogeneous solution is obtained. If the plastic is prepared in a kneading machine the solvent may be added direct with continued kneading.

Three coats of the composition thus reduced to spreader viscosity with xylol were applied to a base consisting of woven glass fibres by a conventional knife spreader coating machine. Three coats were applied to give a thickness of about 3 mils and although the invention is operative with less or somewhat greater thicknesses, for most purposes the coating should be at least 2 mils in thickness. Each coat was dried at 240° F. for approximately 2 minutes in order to remove the volatile solvent and to promote the reaction between the "Butacite" resin and the insolubilizing agent, in this instance the urea-formaldehyde resin.

The electrical resistance of an unsupported film of the semi-conducting composition or coated on the glass fibre substrate was 300 ohms per inch square.

Eight strips of the coated glass fabric one inch wide and 10 inches in length were fitted with metal electrical connectors so that there was direct contact with the coating and placed in an electrical circuit in parallel relationship with ½ inch spacing as shown in the attached drawing. The circuit also included conventional controlling automatic thermostats and a rheostat as illustrated in the drawing.

The heating element with the automatic thermostat controls was substituted for the ordinary resistance wire heating element in a commercial household heating pad containing fibrous padding and covered with a rubberized fabric and the terminals of the unit connected to a 60 cycle 110 volt A. C. lighting circuit.

It was found that the new heating element performed satisfactorily as a source of heat which could be controlled by the automatic thermostats and rheostat in the same manner as with the conventional resistance wire heating element. However, with the new element, the heating was more uniform over the heating pad area. The improved element was functioning perfectly after a period of 30 days' continuous heating service.

Example 2

| | Per cent by weight |
|---|---|
| Alkyd resin solution | 40.3 |
| Polyvinyl butyral resin ("Butacite") | 9.0 |
| Dibutyl ether of dimethylol urea solution | 5.8 |
| Dicapryl phthalate | 4.6 |
| "Spheron N" carbon black | 40.3 |
| | 100.0 |

The alkyd resin solution and the polyvinyl butyral resin used in this composition were of the same type as described in Example 1.

The insolubilizing agent for the polyvinyl resin consisted of a 70% solution in butanol of dibutyl ether of dimethylol urea.

The "Spheron N" carbon black used in this example consisted of a special "channel" carbon black marketed by Godfrey L. Cabot, Inc., which also has low electrical resistivity.

The preparation of the composition and coated glass fabric including the arrangement of the heating elements in the electrical circuit were in accordance with the description of Example 1 and the drawing. Similar heating results were also obtained in this instance.

In the drawing, there is represented a satisfactory arrangement of the new heating element for use in the construction of a household heating pad which illustrates one of the many utilities of the present invention. In the drawing, I represents a conventional rheostat control for the control of electricity from a 60 cycle 110 volt household lighting circuit as the source of power as indicated. An ordinary toggle switch is shown as 2 which permits opening and closing of the circuit manually. A variable thermostat 3 may be included in the circuit which functions from the heat developed in the pad and from heat developed in the small resistance wire 4 and makes or breaks the circuit through the action of the bi-metal arm 5. Conventional bi-metal thermostat units (one or more) shown as 6 may also be included in the circuit as additional controls. A plurality of glass fibre strips 1 inch wide and 10 inches in length coated with the alkyd resin composition containing the semi-conducting carbon black comprising the heating elements are shown by 7. These heating elements are placed in parallel with a spacing of about ½ inch in the circuit and made a part thereof by means of the electrical connectors which make positive electrical contact between the semi-conducting composition and the electrical conductors.

In the organic vehicles for the semi-conducting carbon black containing an alkyd resin as the essential film-forming ingredient, castor oil modified alkyd resins as shown in Example 1 are preferred. Other non-drying oils such as coconut and cottonseed may also be used as modifiers for the alkyd resin. For present purposes, the percentage of oil in the modified alkyd resin is ordinarily between 30 and 60%. Drying oils are not desired because of their greater tendency to oxidize and cause embrittling in the present utility where heat tends to promote such tendencies. Phthalic anhyride is the preferred acid radical in the alkyd resin ingredient of the improved compositions but other carboxylic acids such as succinic, malic, adipic, maleic, sebacic, etc., may be substituted wholly or in part for the phthalic anhydride, but best results may be secured when phthalic anhydride is employed as the sole acid radical or at least in preponderant amounts. Suitable alkyd resins for the new compositions may also be prepared from other polyhydric alcohols including ethylene glycol and higher homologs, diethylene glycol and other polyglycols, polyglycerols, pentaerythritol and sorbitol.

Although the use of polyvinyl butyral is shown in the examples, the invention is also applicable with other polyvinyl acetal resins including reaction products of hydrolyzed (or partially hydrolyzed) polyvinyl esters with the lower alkyl aldehydes such as formaldehyde, acetaldehyde, propionaldehyde and valeraldehyde. The polyvinyl acetal toughens and strengthens the coating and facilitates application by spreading or calendering on fabrics and other sheet material and functions also to prevent excessive penetration into such porous bases.

The butanol modified urea-formaldehyde resin shown in the Example 1 reacts with the polyvinyl acetals as a cross-linking agent for the double bonds resulting in an insolubilizing of the acetal and a reduction in plastic flow. Other agents which function in a similar manner and may be used in place of the butanol modified urea-formaldehyde condensation product shown in Example 1 include N,N'-bis(alkoxymethyl) urons, described in co-pending application S. N. 438,949 to Maxwell, filed April 14, 1942, alcohol modified melamine-formaldehyde condensation products of co-pending application S. N. 491,400 to Vaala, filed June 18, 1943 (also U. S. Patent 2,197,357), dimethylol urea and alkyl ethers of dimethylol urea as described in co-pending application S. N. 489,805 to Vaala, filed June 5, 1943, and organic complexes of the Werner type in which a trivalent chromium atom is coordinated with a carboxylic acido group having at least 10 carbon atoms such as stearato chromic acetate as disclosed in co-pending application S. N. 498,981 to Johnson, filed August 17, 1943.

The plasticizers or softeners which may be used in the present invention include conventional materials such as castor oil, blown castor oil, aryl sulfonamides, aryl and alkyl esters of phosphoric acid, dibutyl tartrate, dicyclohexyl phthalate, diethyl phthalate and the phthalate esters of the ether alcohols such as the butyl ester of ethylene glycol monomethyl ether.

As previously indicated, the carbon black used in the present composition has an electrical resistivity of between about 0.152 ohm per 1" cube and preferably not over about 1.0 ohm per 1" cube. Acetylene black (Shawinigan Black) is of particular merit in the present compositions although "Graphon," a graphitized carbon black, prepared from natural gas ("channel" carbon black) treated in accordance with U. S. Patent 2,134,950 and also having a low electrical resistivity, is also representative of suitable semi-conducting carbon blacks. Other special forms of "channel" carbon black sold by Godfrey L. Cabot, Inc., under the trade names "Spheron N," "Spheron T" and "Spheron C" have also been found operable for the present purposes.

These semi-conducting materials may be used in the proportion of 1 part by weight of the carbon black to between about 0.25 and 4 parts by weight of vehicle solids including the resin components and the plasticizer. A ratio of vehicle solids of between about 1 to 2 parts to 1 part of carbon black of the type defined above is preferred. If there is any substantial departure from the limits indicated, the primary objectives of the invention are not fully attained. If the semi-conducting carbon black is present in proportions substantially below the limits established, the desired conductance is not obtained probably due to absence of direct contact between particles and if the carbon black is incorporated in substantially greater proportions than the upper limit suggested, there are deficiencies in film properties of the coating.

Another factor which has been a contributing influence on the conductance of the coating is the degree of dispersion of the semi-conducting carbon black as controlled by the grinding conditions, particularly the grinding cycle employed in dispersing the pigment in the vehicle. Extended grinding cycles apparently cause the particles of the carbon black to become surrounded with the vehicle which is relatively insulating in character, thus adversely affecting the desired conductance in the final coating.

The improved heating element may comprise a free film of the composition although in general it is preferred to apply the composition to a heat resisting substrate such as a fabric of asbestos or glass fibres.

The invention is illustrated in the attached drawing in its preferred embodiment as a plurality of coated strips comprising a series of heating elements. In some instances the heating element may comprise a single large sheet of the composition as a free film or coated on a heat resistance substrate. In such construction the electrical conductors may be positioned at opposite marginal sides of the sheet and connected with the semi-conducting composition at intervals of such spacing as already shown, by any suitable means, such as metal snap fasteners or metal staples or the conductors may be woven through the marginal edges of the semi-conducting sheet material and embedded in the composition itself. For very large areas such as electrically heated blankets, it may be desirable to use a plurality of intermediate metal conductors interspaced uniformly throughout the entire area in order to decrease the distance between the conductors and insure uniformity of heating.

It has been found that for maximum uniformity in heating, the semi-conducting film strips should not greatly exceed about 2 inches in width since the electric current in traveling the shortest distance between the electrical connections on opposite ends of the strips does not provide uniform heating effects much beyond this limit under the conditions described. For the same reasons of heating uniformity, it is preferred to space the electrical conductors in the modification where a number of electric conductors are used in a large area such as a blanket not more than about 2 inches apart.

Some of the important uses for the improved heating element include household heating pads and blankets, flying suits, walls and drapes for heating rooms, in coverings for flying instruments and in leading edges of aircraft wings for de-icing purposes. The new heating means is generally useful with considerable advantage for all purposes for which the conventional resistance wire heating elements have been used heretofore.

The heating element of the present invention offers numerous important advantages. The improved element because of its great flexibility readily conforms to all contours thus making it adapted to the covering of such objects as flying instruments, a utility that is difficult to meet with older devices. Failure by short circuit is eliminated in the new element. Interruption of the flow of electric current by a break in the circuit such as is frequently encountered in conventional heating elements, particularly when the device is subjected in normal usage to considerable bending and twisting is avoided in the improved heating element, thus insuring longer useful life for the device of which the element is a part. The new element is less expensive and is characterized by longer life in service. Furthermore, greater uniformity in heating is also obtained and physical hazards from short circuits by electric shock or firing of the heating device are avoided in the improved heating means. The heating element of the invention is also tough and flexible at low and high temperatures, resistant to water and mineral oils and the heat developed from this source is more readily controllable. A unique and important advantage that distinguishes the new heating element resides in its great resistance to deterioration from long exposures to heat and oxidizing conditions, thus showing valuable superiority to similarly constructed heating elements which employ other polymeric vehicles for the semi-conducting carbon black such as rubber, synthetic rubber and cellulose derivatives.

It is apparent that many widely different embodiments of the invention may be made without departing from the spirit and scope thereof and, therefore, it is not intended to be limited except as indicated in the appended claims.

We claim:
1. An improved heating element adapted to develop heat when connected to a source of electric energy comprising a semi-conducting film of a polymeric organic substantially non-conducting composition containing an alkyd resin, a polyvinyl acetal resin, an insolubilizing agent for said acetal resin and a carbon black having an electrical resistivity of less than about 1.0 ohm per 1" cube, said film carrying electric connector terminals in direct contact therewith.

2. Heating element of claim 1 in which the insolubilizing agent is a urea-formaldehyde resin.

3. Heating element of claim 1 in which the insolubilizing agent is an alkyl ether of dimethylol urea.

4. Heating element of claim 1 in which the insolubilizing agent is an organic complex of the Werner type in which trivalent chromium atom is coordinated with a carboxylic acido group having at least 10 carbon atoms.

5. An improved heating element adapted to develop heat when connected to a source of electric energy comprising a film of approximately the following composition:

| | Parts by weight |
|---|---|
| 53% castor oil modified diglycerol triphthalate resin | 26.3 |
| Polyvinyl butyral resin | 9.8 |
| Butanol modified urea-formaldehyde resin | 4.4 |
| Dicapryl phthalate | 4.9 |
| Acetylene black | 34.2 | carrying connector terminals in direct contact with said composition.

DONALD E. EDGAR.
DAVID J. SULLIVAN.